US012802118B2

(12) United States Patent
Piatski et al.

(10) Patent No.: US 12,802,118 B2
(45) Date of Patent: Nov. 17, 2026

(54) USING MACHINE-LEARNING MODEL OF AN ONLINE SYSTEM FOR DYNAMIC MODIFICATION OF AN ORDER AUTHORIZATION BUFFER

(71) Applicant: Maplebear Inc., San Francisco, CA (US)

(72) Inventors: Alexander S. Piatski, New York, NY (US); Robert Fletcher, Los Angeles, CA (US); Levi Boxell, Brownsburg, IN (US); Fang Guo, Sunnyvale, CA (US); Xiaobo Liu, San Jose, CA (US); Tilman Drerup, Berkeley, CA (US); Aditya Karan, Naperville, IL (US)

(73) Assignee: Maplebear Inc., San Francisco, CA (US)

( * ) Notice: Subject to any disclaimer, the term of this patent is extended or adjusted under 35 U.S.C. 154(b) by 162 days.

(21) Appl. No.: 18/965,877

(22) Filed: Dec. 2, 2024

(65) Prior Publication Data

US 2026/0154727 A1 Jun. 4, 2026

(51) Int. Cl.
*G06Q 30/00* (2023.01)
*G06N 20/00* (2019.01)
*G06Q 30/0601* (2023.01)

(52) U.S. Cl.
CPC ......... *G06Q 30/0635* (2013.01); *G06N 20/00* (2019.01)

(58) Field of Classification Search
CPC .................................................. G06Q 30/0635
See application file for complete search history.

(56) References Cited

U.S. PATENT DOCUMENTS

2012/0036073 A1* 2/2012 Basu ...................... G06Q 20/42 705/44
2025/0069070 A1* 2/2025 Ravinathan ............ G06Q 20/12
2025/0191051 A1* 6/2025 Riso ................... G06Q 30/0633

OTHER PUBLICATIONS

Bakar, Khairul Azmi Abu, and Galoh Rashidah Haron. "Adaptive authentication: Issues and challenges." 2013 World Congress on Computer and Information Technology (WCCIT). IEEE, 2013.*

* cited by examiner

*Primary Examiner* — Kathleen Palavecino
(74) *Attorney, Agent, or Firm* — Fenwick & West LLP

(57) ABSTRACT

An online system uses a trained machine-learning model for dynamically modifying an authorization buffer amount to cover additional expenses occurring during fulfillment of an online order. Upon receiving a signal indicating that a user entered an online checkout stage of the order, the online system applies the machine-learning model to generate a set of values of a metric for a set of authorization buffer amounts, each value of the metric resulting from charging the user a respective authorization buffer amount over an expected value of the order if a value of the order at delivery is greater than the expected value. The online system selects an authorization buffer amount resulting in the largest value of the metric, and generates an authorization signal that authorizes charging the user the authorization buffer amount over the expected value if the value of the order is greater than the expected value.

20 Claims, 4 Drawing Sheets

USING MACHINE-LEARNING MODEL OF AN ONLINE SYSTEM FOR DYNAMIC MODIFICATION OF AN ORDER AUTHORIZATION BUFFER

BACKGROUND

Online systems allow their users to browse and acquire items by placing online orders. When a user of an online system places an online order and before pickers associated with the online system are checking out at a source (e.g., retailer store), the user's credit card is authorized for an amount that is sufficient to cover a cost of the online order, which is typically the predicted order amount increased by some additional buffer amount to cover any overages. For example, a rule for buffering the authorization amount can be 110% of the order amount, where the additional buffer amount is 10% of the order amount.

At the checkout performed at the source (e.g., by the picker or the user), however, the actual order amount can often vary for many reasons, such as price changes, replacement items, and variable weight items. Setting the additional buffer amount too high or too low has several disadvantages. For example, too high of a buffer amount may cause transaction to be denied, so the order would be canceled; and too low of a buffer amount could result in an inability to recover an overage. The authorization can be also performed throughout a fulfillment session, e.g., as more items are added, each time an additional authorization may be performed. However, this is not preferable since it creates many charges on a credit card, and it costs additional fees each time the authorization is performed.

Accordingly, there is a need for technical means to determine an authorization amount using machine learning, and preferably to reduce the need to set the authorization amount multiple times during an order fulfillment process.

SUMMARY

Embodiments of the present disclosure are directed to using a trained machine-learning model of an online system for dynamic modification of an order authorization buffer for covering additional expenses that may occur during fulfillment of an order placed at the online system.

In accordance with one or more aspects of the disclosure, the online system receiving, via a network from a device associated with a user of the online system, an event signal indicating that the user enters a conversion stage of an order when the user converts on items included in the order. The online system evaluates, using information about the items, an expected value of the order at the conversion stage. Responsive to the received event signal, the online system accesses a metric prediction machine-learning model of the online system, wherein the metric prediction machine-learning model is trained to predict a value of a metric associated with a fulfillment of the order, the value of the metric resulting from applying an authorization buffer amount that authorizes charging the user the authorization buffer amount over the expected value of the order if a value of the order when the order is delivered to the user is greater than the expected value of the order. The online system applies the metric prediction machine-learning model to at least one of information about the user, information about the order, or information about a source where the items are located to generate a set of values of the metric for a set of authorization buffer amounts, each value of the metric from the set of values of the metric resulting from the applying a respective authorization buffer amount from the set of authorization buffer amounts. The online system selects, from the set of authorization buffer amounts, an authorization buffer amount resulting in a largest value of the metric among the set of values of the metric. The online system generates an authorization signal using the selected authorization buffer amount. The online system sends, via the network to an online platform, the authorization signal that authorizes charging the user the selected authorization buffer amount over the expected value of the order upon the fulfillment of the order if the value of the order is greater than the expected value of the order.

DETAILED DESCRIPTION

Figure 1:
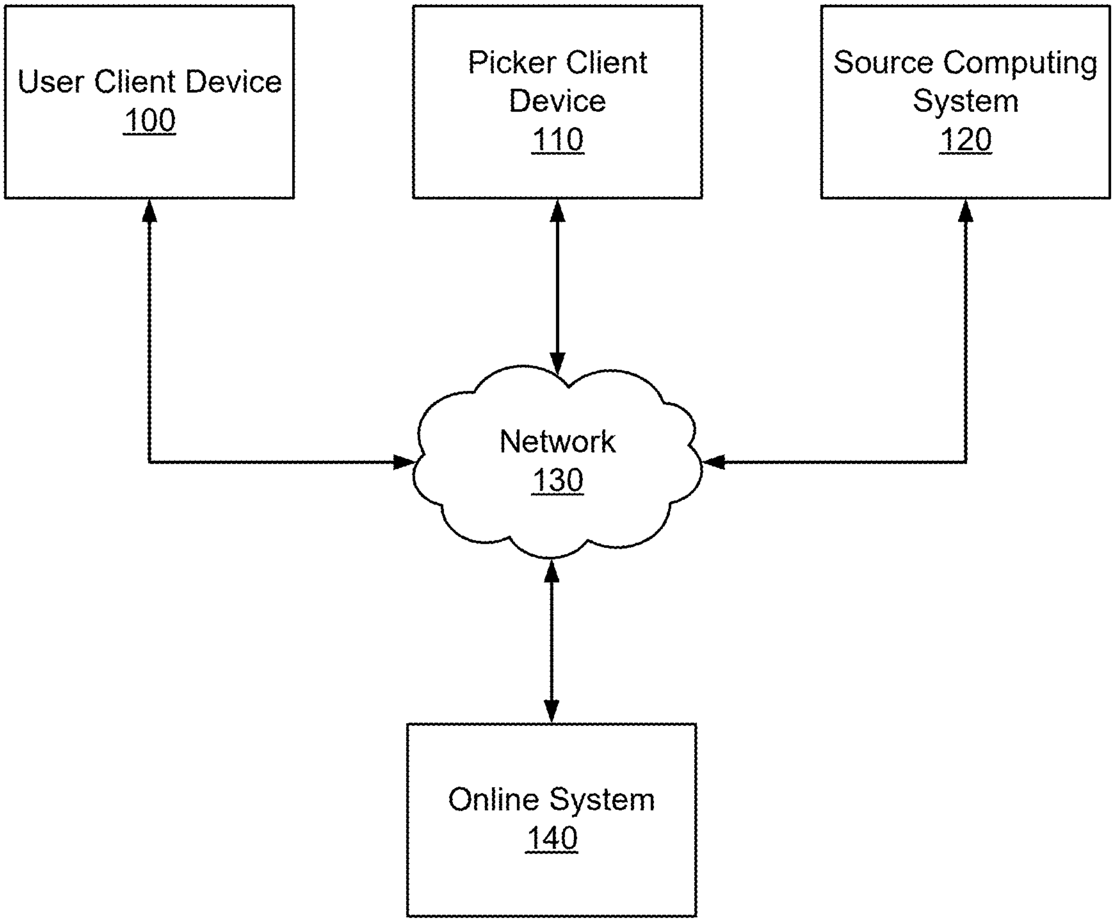
FIG. 1 illustrates an example system environment for an online system, in accordance with one or more embodiments.

FIG. 1 illustrates an example system environment for an online system 140, in accordance with one or more embodiments. The system environment illustrated in FIG. 1 includes a user client device 100, a picker client device 110, a source computing system 120, a network 130, and an online system 140. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

Although one user client device 100, picker client device 110, and source computing system 120 are illustrated in FIG. 1, any number of users, pickers, and sources may interact with the online system 140. As such, there may be more than one user client device 100, picker client device 110, or source computing system 120.

The user client device 100 is a client device through which a user may interact with the picker client device 110, the source computing system 120, or the online system 140. The user client device 100 can be a personal or mobile computing device, such as a smartphone, a tablet, a laptop computer, or desktop computer. In some embodiments, the user client device 100 executes a client application that uses an application programming interface (API) to communicate with the online system 140.

A user uses the user client device 100 to place an order with the online system 140. An order specifies a set of items to be delivered to the user. An "item," as used herein, means a good or product that can be provided to the user through the online system 140. The order may include item identifiers (e.g., a stock keeping unit (SKU) or a price look-up (PLU) code) for items to be delivered to the user and may include quantities of the items to be delivered. Additionally, an order may further include a delivery location to which the ordered items are to be delivered and a timeframe during which the items should be delivered. In some embodiments, the order also specifies one or more sources from which the ordered items should be collected.

The user client device 100 presents an ordering interface to the user. The ordering interface is a user interface that the user can use to place an order with the online system 140. The ordering interface may be part of a client application operating on the user client device 100. The ordering interface allows the user to search for items that are available through the online system 140 and the user can select which items to add to an "ordering list." An "ordering list," as used herein, is a tentative set of items that the user has selected for an order but that has not yet been finalized for an order. The ordering list may alternatively be referred to as a "cart" or "shopping cart." The ordering interface allows a user to update the ordering list, e.g., by changing the quantity of items, adding or removing items, or adding instructions for items that specify how the item should be collected.

The user client device 100 may receive additional content from the online system 140 to present to a user. For example, the user client device 100 may receive coupons, recipes, or item suggestions. The user client device 100 may present the received additional content to the user as the user uses the user client device 100 to place an order (e.g., as part of the ordering interface).

Additionally, the user client device 100 includes a communication interface that allows the user to communicate with a picker (i.e., fulfillment agent, servicing agent, or agent) that is servicing the user's order. This communication interface allows the user to input a text-based message to transmit to the picker client device 110 via the network 130. The picker client device 110 receives the message from the user client device 100 and presents the message to the picker. The picker client device 110 also includes a communication interface that allows the picker to communicate with the user. The picker client device 110 transmits a message provided by the picker to the user client device 100 via the network 130. In some embodiments, messages sent between the user client device 100 and the picker client device 110 are transmitted through the online system 140. In addition to text messages, the communication interfaces of the user client device 100 and the picker client device 110 may allow the user and the picker to communicate through audio or video communications, such as a phone call, a voice-over-IP call, or a video call.

The picker client device 110 is a client device through which a picker may interact with the user client device 100, the source computing system 120, or the online system 140. The picker client device 110 can be a personal or mobile computing device, such as a smartphone, a tablet, a laptop computer, or a desktop computer. In some embodiments, the picker client device 110 executes a client application that uses an application programming interface (API) to communicate with the online system 140.

The picker client device 110 receives orders from the online system 140 for the picker to service. A picker services an order by collecting the items listed in the order from a source. The picker client device 110 presents the items that are included in the user's order to the picker in a collection interface. The collection interface is a user interface that provides information to the picker on which items to collect for a user's order and the quantities of the items. In some embodiments, the collection interface provides multiple orders from multiple users for the picker to service at the same time from the same source location. The collection interface further presents instructions that the user may have included related to the collection of items in the order. Additionally, the collection interface may present a location of each item at the source, and may even specify a sequence in which the picker should collect the items for improved efficiency in collecting items. In some embodiments, the picker client device 110 transmits to the online system 140 or the user client device 100 which items the picker has collected in real time as the picker collects the items.

The picker can use the picker client device 110 to keep track of the items that the picker has collected to ensure that the picker collects all the items for an order. The picker client device 110 may include a barcode scanner that can decode an item identifier encoded in a machine-readable label (e.g., a barcode or a QR code) coupled to an item. The picker client device 110 compares this item identifier to items in the order that the picker is servicing, and if the item identifier corresponds to an item in the order, the picker client device 110 identifies the item as collected. In some embodiments, rather than or in addition to using a barcode scanner, the picker client device 110 captures one or more images of the item and identifies the item identifier for the item based on the images. The picker client device 110 may determine the item identifier directly or by transmitting the images to the online system 140. Furthermore, the picker client device 110 determines weights for items that are priced by weight. The picker client device 110 may prompt the picker to manually input the weight of an item or may communicate with a weighing system in the source location to receive the weight of an item.

When the picker has collected the items for an order, the picker client device 110 instructs a picker on where to deliver the items for a user's order. For example, the picker client device 110 displays a delivery location from the order to the picker. The picker client device 110 also provides navigation instructions for the picker to travel from the source location to the delivery location. When a picker is servicing more than one order, the picker client device 110 identifies which items should be delivered to which delivery location. The picker client device 110 may provide navigation instructions from the source location to each of the delivery locations. The picker client device 110 may receive one or more delivery locations from the online system 140 and may provide the delivery locations to the picker so that the picker can deliver the corresponding one or more orders to those locations. The picker client device 110 may also provide navigation instructions for the picker from the source location from which the picker collected the items to the one or more delivery locations.

In some embodiments, the picker client device 110 tracks the location of the picker as the picker delivers orders to delivery locations. The picker client device 110 collects location data and transmits the location data to the online system 140. The online system 140 may transmit the location data to the user client device 100 for display to the user, so that the user can keep track of when their order will be delivered. Additionally, the online system 140 may generate updated navigation instructions for the picker based on the picker's location. For example, if the picker takes a wrong turn while traveling to a delivery location, the online system 140 determines the picker's updated location based on location data from the picker client device 110 and generates updated navigation instructions for the picker based on the updated location.

In some embodiments, the picker is a single person who collects items for an order from a source location and delivers the order to the delivery location for the order.

Alternatively, more than one person may serve the role of a picker for an order. For example, multiple people may collect the items at the source location for a single order. Similarly, the person who delivers an order to its delivery location may be different from the person or people who collected the items from the source location. In these embodiments, each person may have a picker client device 110 that they can use to interact with the online system 140.

Additionally, while the description herein may primarily refer to pickers as humans, in some embodiments, some or all of the steps taken by the picker may be automated. For example, a semi- or fully-autonomous robot may collect items in a source location for an order and an autonomous vehicle may deliver an order to a user from a source location.

In one or more embodiments, the online system 140 communicates with a smart shopping cart being used by a user to collect items in a source location. For example, the smart shopping cart may display content received from the online system 140 and may receive data describing items that are collected by the user and stored in a storage area of the shopping cart. In some embodiments, the smart shopping cart is a picker client device 110 being operated by a picker collecting items within a source location. Similarly, the smart shopping cart may be operated by a user within the source location collecting items for themselves. Example embodiments of smart shopping carts are described in U.S. patent application Ser. No. 18/630,672, entitled "Automated Identification of Items Placed in a Cart and Recommendations based on Same," filed Apr. 9, 2024, which is hereby incorporated by reference in its entirety.

The source computing system 120 is a computing system operated by a source that interacts with the online system 140. As used herein, a "source" is an entity that operates a "source location," which is a store, warehouse, or any other source from which a picker can collect items. The source computing system 120 stores and provides item data to the online system 140 and may regularly update the online system 140 with updated item data. For example, the source computing system 120 provides item data indicating which items are available at a particular source location and the quantities of those items. Additionally, the source computing system 120 may transmit updated item data to the online system 140 when an item is no longer available at the source location. Additionally, the source computing system 120 may provide the online system 140 with updated item prices, sales, or availabilities. Additionally, the source computing system 120 may receive payment information from the online system 140 for orders serviced by the online system 140. Alternatively, the source computing system 120 may provide payment to the online system 140 for some portion of the overall cost of a user's order (e.g., as a commission).

The user client device 100, the picker client device 110, the source computing system 120, and the online system 140 can communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all of the standard layers used to describe a physical or virtual network, such as the physical layer, the data link layer, the network layer, the transport layer, the session layer, the presentation layer, and the application layer. The network 130 may include physical media for communicating data from one computing device to another computing device, such as multiprotocol label switching (MPLS) lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online system 140 is an online system by which users can order items to be provided to them by a picker from a source. The online system 140 receives orders from a user client device 100 through the network 130. The online system 140 selects a picker to service the user's order and transmits the order to a picker client device 110 associated with the picker. If the picker accepts the order, the picker collects the ordered items from a source location and delivers the ordered items to the user. The online system 140 may charge a user for the order and provide portions of the payment from the user to the picker and the source.

As an example, the online system 140 may allow a user to order groceries from a source location. The user's order may specify which groceries they want to be delivered from the source location and the quantities of each of the groceries. The user client device 100 transmits the user's order to the online system 140 and the online system 140 selects a picker to travel to the source location to collect the groceries ordered by the user. The online system transmits an offer to the picker for the picker to service the order in exchange for consideration and, if the picker accepts the offer, the picker collects the groceries from the source location. Once the picker has collected the groceries ordered by the user, the picker delivers the groceries to a location transmitted to the picker client device 110 by the online system 140.

When a user places a new order with the online system 140, the online system 140 runs a preauthorization on the user's credit card to make sure that the payment transfer will be authorized. Unlike a traditional online purchase, where the actual amount is simply charged, the online system 140 preauthorizes an additional buffer amount over the expected order amount, since the actual cost of the order is not known until the final delivery to the user. This additional buffer amount preauthorized for a specific order can be referred to herein as "an authorization buffer", "an authorization buffer amount" or "an order authorization buffer." The authorization buffer charges the user a temporary, additional amount to cover any extra costs that may occur after the user's checkout (e.g., additional items, picker replacements, etc.). The authorization buffer protects the online system 140 from potentially paying expenses that the online system 140 cannot recoup from the user.

The traditional payment process at the online system 140 may include the following steps. First, when a user places an order at the online system 140, the online system 140 may place a temporary hold that is typically greater than the cart total, i.e., the initial authorization buffer may be set. Second, if post-order modifications exceed some threshold, the online system 140 may place an additional authorization or hold on the user's credit card to prevent the excess unpaid risk. At the final step, the online system 140 may authorize captures and a reconciliatory charge. When the order is delivered, the online system 140 may attempt to collect the final amount from the user, e.g., by capturing all open authorizations. If this final amount exceeds the sum of prior authorizations, the online system 140 may charge the user for the remainder, i.e., the final charge may be performed. However, the online system 140 may still be at risk of unpaid amounts if changes exceed the prior authorization amounts since the final charge is not guaranteed to be processed (because the final charge is not backed by an authorization).

All of the steps of this payment process are interrelated, and changes in one step can affect what is optimal in the other steps. Additionally, there may be tradeoffs between unpaid amounts, fees, and user's experience at each of these steps. This payment process may also require heuristics to be applied to additional authorizations, since many orders are modified after the users' checkouts.

Various issues may occur when the authorization buffer is of an incorrect size. For example, one issue of using too large of the authorization buffer may be an insufficient user's fund. A large authorization buffer may introduce a likelihood that the user is unable to cover the authorization amount, even if the user has enough funds to cover the actual order amount. Another issue of using too large of the authorization buffer may be a surprise charge, i.e., a user can be confused and frustrated that the authorization amount on their credit card is different from their order amount, and the user may lose trust in the online system 140. Yet another issue of using too large of the authorization buffer may be a mismatched charge, i.e., a user may see a different authorization price from their order price, which leads to user's confusion and the loss of trust.

On the other hand, one issue of using too small of the authorization buffer may be an occurrence of multiple authorizations. Depending on the gap between the preauthorized amount and actual costs of order fulfillment, multiple authorizations may need to be applied if the authorization buffer amount is too low, and each authorization incurs additional payment costs. Another issue of using too small of the authorization buffer may be the annoying user's experience, i.e., the user may be annoyed and/or confused to have multiple statements on their payment method for a single order. Yet another issue of using too small of the authorization buffer may be an underpayment, i.e., if there is a gap between a preauthorization amount and an actual amount, there is a mismatch that leads to uncovered balances.

To determine a preferred buffer amount for preauthorization, the online system 140 uses a trained machine-learning model, which predicts a metric (e.g., an incremental profit) for a given buffer amount. The online system 140 predicts the metric for a range of buffer amounts and then selects a preferred buffer amount based on that prediction, i.e., a buffer amount that provides the largest predicted incremental profit (or the largest metric value) for the entire range of buffer amounts. During the order fulfillment process, various triggers (e.g., adding items to an order while picking, replacement of one or more items from the original orders, etc.) may cause the online system 140 to re-run this preauthorization determination process. The online system 140 is described in further detail below with regards to FIG. 2.

Figure 2:
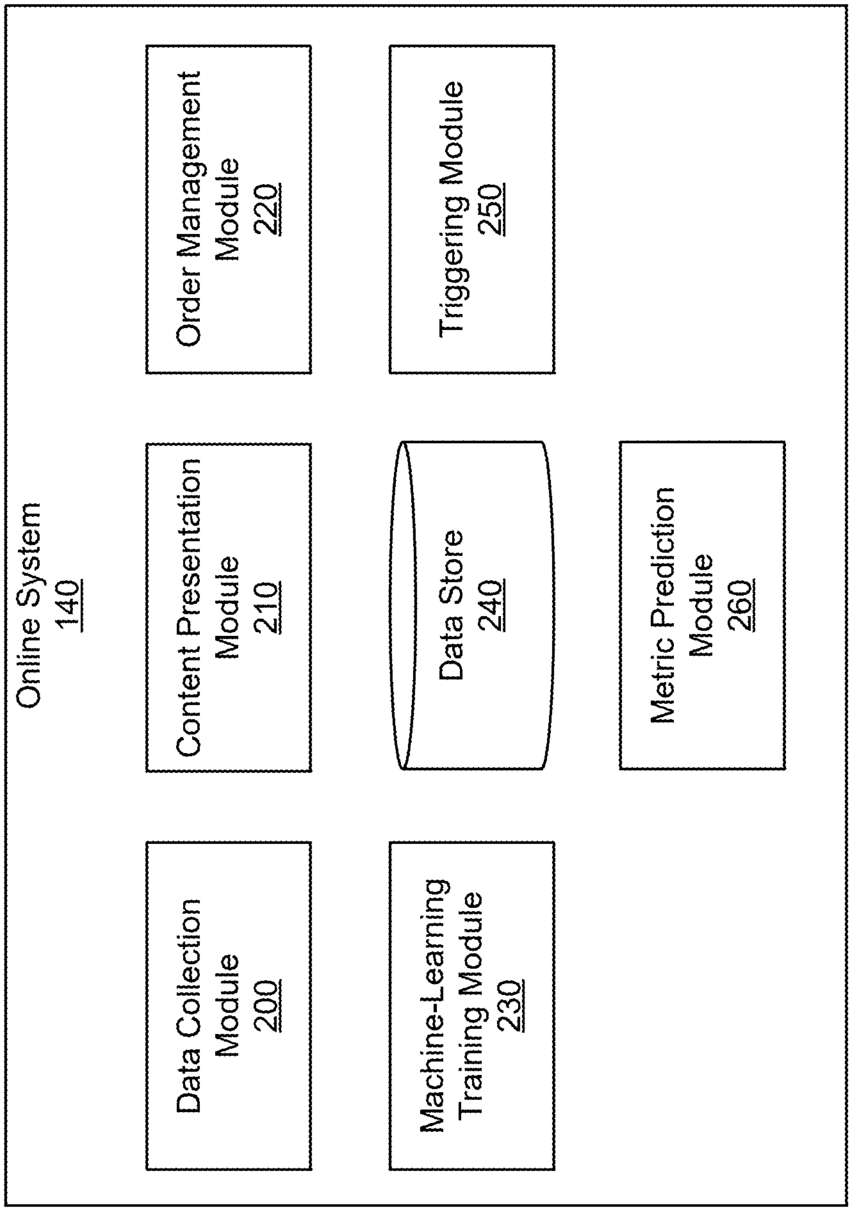
FIG. 2 illustrates an example system architecture for an online system, in accordance with one or more embodiments.

FIG. 2 illustrates an example system architecture for the online system 140, in accordance with some embodiments. The system architecture illustrated in FIG. 2 includes a data collection module 200, a content presentation module 210, an order management module 220, a machine-learning training module 230, a data store 240, a triggering module 250, and a metric prediction module 260. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data collection module 200 collects data used by the online system 140 and stores the data in the data store 240. In preferred embodiments, the data collection module 200 only collects data describing a user if the user has previously explicitly consented to the online system 140 collecting data describing the user. Additionally, the data collection module 200 may encrypt all data, including sensitive or personal data, describing users.

For example, the data collection module 200 collects user data, which is information or data that describe characteristics of a user. User data may include a user's name, address, shopping preferences, favorite items, or stored payment instruments. The user data also may include default settings established by the user, such as a default source/source location, payment instrument, delivery location, or delivery timeframe. The data collection module 200 may collect the user data from sensors on the user client device 100 or based on the user's interactions with the online system 140.

The data collection module 200 also collects item data, which is information or data that identifies and describes items that are available at a source location. The item data may include item identifiers for items that are available and may include quantities of items associated with each item identifier. Additionally, item data may also include attributes of items such as the size, color, weight, stock keeping unit (SKU), or serial number for the item. The item data may further include purchasing rules associated with each item, if they exist. For example, age-restricted items such as alcohol and tobacco are flagged accordingly in the item data. Item data may also include information that is useful for predicting the availability of items in source locations. For example, for each item-source combination (a particular item at a particular warehouse), the item data may include a time that the item was last found, a time that the item was last not found (a picker looked for the item but could not find it), the rate at which the item is found, or the popularity of the item. The data collection module 200 may collect item data from the source computing system 120, the picker client device 110, or the user client device 100.

An item category is a set of items that are a similar type of item. Items in an item category may be considered to be equivalent to each other or may be replacements for each other in an order. For example, different brands of sourdough bread may be different items, but these items may be in a "sourdough bread" item category. The item categories may be human-generated and human-populated with items. The item categories also may be generated automatically by the online system 140 (e.g., using a clustering algorithm).

The data collection module 200 also collects picker data, which is information or data that describes characteristics of pickers. For example, the picker data for a picker may include the picker's name, the picker's location, how often the picker has serviced orders for the online system 140, a user rating for the picker, which sources the picker has collected items at, or the picker's previous shopping history. Additionally, the picker data may include preferences expressed by the picker, such as their preferred sources to collect items at, how far they are willing to travel to deliver items to a user, how many items they are willing to collect at a time, timeframes within which the picker is willing to service orders, or payment information by which the picker is to be paid for servicing orders (e.g., a bank account). The data collection module 200 collects picker data from sensors of the picker client device 110 or from the picker's interactions with the online system 140.

Additionally, the data collection module 200 collects order data, which is information or data that describes characteristics of an order. For example, order data may include item data for items that are included in the order, a delivery location for the order, a user associated with the order, a source location from which the user wants the ordered items collected, or a timeframe within which the user wants the order delivered. Order data may further include information describing how the order was serviced, such as which picker serviced the order, when the order was delivered, or a rating that the user gave the delivery of the order. In some embodiments, the order data includes user data for users associated with the order, such as user data for a user who placed the order or picker data for a picker who serviced the order.

While user data, picker data, source data, item data, and order data are described separately, data collected by the data collection module 200 may fall into more than one of these categories. For example, data describing a picker's performance for an order may be order data and picker data.

The content presentation module 210 selects content for presentation to a user. For example, the content presentation module 210 selects which items to present to a user while the user is placing an order. The content presentation module 210 generates and transmits an ordering interface for the user to order items. The content presentation module 210 populates the ordering interface with items that the user may select for adding to their order. In some embodiments, the content presentation module 210 presents a catalog of all items that are available to the user, which the user can browse to select items to order. The content presentation module 210 also may identify items that the user is most likely to order and present those items to the user. For example, the content presentation module 210 may score items and rank the items based on their scores. The content presentation module 210 displays the items with scores that exceed some threshold (e.g., the top n items or the p percentile of items).

The content presentation module 210 may use an item selection model to score items for presentation to a user. An item selection model is a machine-learning model that is trained to score items for a user based on item data for the items and user data for the user. For example, the item selection model may be trained to determine a likelihood that the user will order the item. In some embodiments, the item selection model uses item embeddings describing items and user embeddings describing users to score items. These item embeddings and user embeddings may be generated by separate machine-learning models and may be stored in the data store 240.

In some embodiments, the content presentation module 210 scores items based on a search query received from the user client device 100. A search query is free text for a word or set of words that indicate items of interest to the user. The content presentation module 210 scores items based on a relatedness of the items to the search query. For example, the content presentation module 210 may apply natural language processing (NLP) techniques to the text in the search query to generate a search query representation (e.g., an embedding) that represents characteristics of the search query. The content presentation module 210 may use the search query representation to score candidate items for presentation to a user (e.g., by comparing a search query embedding to an item embedding).

In some embodiments, the content presentation module 210 scores items based on a predicted availability of an item. The content presentation module 210 may use an availability model to predict the availability of an item. An availability model is a machine-learning model that is trained to predict the availability of an item at a particular source location. For example, the availability model may be trained to predict a likelihood that an item is available at a source location or may predict an estimated number of items that are available at a source location. The content presentation module 210 may apply a weight to the score for an item based on the predicted availability of the item. Alternatively, the content presentation module 210 may filter out items from presentation to a user based on whether the predicted availability of the item exceeds a threshold.

The order management module 220 manages orders for items from users. The order management module 220 receives orders from a user client device 100 and offers the orders to pickers for service based on picker data. For example, the order management module 220 offers an order to a picker based on the picker's location and the location of the source from which the ordered items are to be collected. The order management module 220 may also offer an order to a picker based on how many items are in the order, a vehicle operated by the picker, the delivery location, the picker's preferences on how far to travel to deliver an order, the picker's ratings by users, or how often a picker agrees to service an order.

In some embodiments, the order management module 220 determines when to offer an order to a picker based on a delivery timeframe requested by the user with the order. The order management module 220 computes an estimated amount of time that it would take for a picker to collect the items for an order and deliver the ordered items to the delivery location for the order. The order management module 220 offers the order to a picker at a time such that, if the picker immediately accepts and services the order, the picker is likely to deliver the order at a time within the requested timeframe. Thus, when the order management module 220 receives an order, the order management module 220 may delay offering the order to a picker if the requested timeframe is far enough in the future (i.e., the picker may be offered the order at a later time and is still predicted to meet the requested timeframe).

When the order management module 220 offers an order to a picker, the order management module 220 transmits the order to the picker client device 110 associated with the picker. The order management module 220 may also transmit navigation instructions from the picker's current location to the source location associated with the order. If the order includes items to collect from multiple source locations, the order management module 220 identifies the source locations to the picker and may also specify a sequence in which the picker should visit the source locations.

The order management module 220 may track the location of the picker through the picker client device 110 to determine when the picker arrives at the source location. When the picker arrives at the source location, the order management module 220 transmits the order to the picker client device 110 for display to the picker. As the picker uses the picker client device 110 to collect items at the source location, the order management module 220 receives item identifiers for items that the picker has collected for the order. In some embodiments, the order management module 220 receives images of items from the picker client device 110 and applies computer-vision techniques to the images to identify the items depicted by the images. The order management module 220 may track the progress of the picker as the picker collects items for an order and may transmit progress updates to the user client device 100 that describe which items have been collected for the user's order.

In some embodiments, the order management module 220 tracks the location of the picker within the source location. The order management module 220 uses sensor data from the picker client device 110 or from sensors in the source location to determine the location of the picker in the source location. The order management module 220 may transmit, to the picker client device 110, instructions to display a map of the source location indicating where in the source location the picker is located. Additionally, the order management module 220 may instruct the picker client device 110 to display the locations of items for the picker to collect, and may further display navigation instructions for how the picker can travel from their current location to the location of the next item to collect for an order.

The order management module 220 determines when the picker has collected the items for an order. For example, the order management module 220 may receive a message from the picker client device 110 indicating that all of the items for an order have been collected. Alternatively, the order management module 220 may receive item identifiers for items collected by the picker and determine when all of the items in an order have been collected. When the order management module 220 determines that the picker has completed an order, the order management module 220 transmits the delivery location for the order to the picker client device 110. The order management module 220 may also transmit navigation instructions to the picker client device 110 that specify how to travel from the source location to the delivery location, or to a subsequent source location for further item collection. The order management module 220 tracks the location of the picker as the picker travels to the delivery location for an order, and updates the user with the location of the picker so that the user can track the progress of the order. In some embodiments, the order management module 220 computes an estimated time of arrival of the picker at the delivery location and provides the estimated time of arrival to the user.

In some embodiments, the order management module 220 facilitates communication between the user client device 100 and the picker client device 110. As noted above, a user may use a user client device 100 to send a message to the picker client device 110. The order management module 220 receives the message from the user client device 100 and transmits the message to the picker client device 110 for presentation to the picker. The picker may use the picker client device 110 to send a message to the user client device 100 in a similar manner.

The order management module 220 coordinates payment by the user for the order. The order management module 220 uses payment information provided by the user (e.g., a credit card number or a bank account) to receive payment for the order. In some embodiments, the order management module 220 stores the payment information for use in subsequent orders by the user. The order management module 220 computes the total cost for the order and charges the user that cost. The order management module 220 may provide a portion of the total cost to the picker for servicing the order, and another portion of the total cost to the source.

The machine-learning training module 230 trains machine-learning models used by the online system 140. The online system 140 may use machine-learning models to perform functionalities described herein. Example machine-learning models include regression models, support vector machines, naïve Bayes, decision trees, k nearest neighbors, random forest, boosting algorithms, k-means, and hierarchical clustering. The machine-learning models may also include neural networks, such as perceptrons, multilayer perceptrons, convolutional neural networks, recurrent neural networks, sequence-to-sequence models, generative adversarial networks, transformers, large-language models, or multi-modal large language models. A machine-learning model may include components relating to these different general categories of model, which may be sequenced, layered, or otherwise combined in various configurations. While the term "machine-learning model" may be broadly used herein to refer to any kind of machine-learning model, the term is generally limited to those types of models that are suitable for performing the described functionality. For example, certain types of machine-learning models can perform a particular functionality based on the intended inputs to, and outputs from, the model, the capabilities of the system on which the machine-learning model will operate, or the type and availability of training data for the model.

Each machine-learning model includes a set of parameters. The set of parameters for a machine-learning model are parameters that the machine-learning model uses to process an input to generate an output. For example, a set of parameters for a linear regression model may include weights that are applied to each input variable in the linear combination that comprises the linear regression model. Similarly, the set of parameters for a neural network may include weights and biases that are applied at each neuron in the neural network. The machine-learning training module 230 generates the set of parameters (e.g., the particular values of the parameters) for a machine-learning model by "training" the machine-learning model. Once trained, the machine-learning model uses the set of parameters to transform inputs into outputs.

The machine-learning training module 230 trains a machine-learning model based on a set of training examples. Each training example includes input data to which the machine-learning model is applied to generate an output. For example, each training example may include user data, picker data, item data, or order data. In some cases, the training examples also include a label which represents an expected output of the machine-learning model. In these cases, the machine-learning model is trained by comparing its output from the input data of a training example to the label for the training example. In general, during training with labeled data, the set of parameters of the model may be set or adjusted to reduce a difference between the output for the training example (given the current parameters of the model) and the label for the training example.

The machine-learning training module 230 may apply an iterative process to train a machine-learning model whereby the machine-learning training module 230 updates parameter values of the machine-learning model based on each of the set of training examples. The training examples may be processed together, individually, or in batches. To train a machine-learning model based on a training example, the machine-learning training module 230 applies the machine-learning model to the input data in the training example to generate an output based on a current set of parameter values. The machine-learning training module 230 scores the output from the machine-learning model using a loss function. A loss function is a function that generates a score for the output of the machine-learning model such that the score is higher when the machine-learning model performs poorly and lower when the machine-learning model performs well. In cases where the training example includes a label, the loss function is also based on the label for the training example. Some example loss functions include the mean square error function, the mean absolute error, hinge loss function, and the cross entropy loss function. The machine-learning training module 230 updates the set of parameters for the machine-learning model based on the score generated by the loss function. For example, the machine-learning training module 230 may apply gradient descent to update the set of parameters.

In some embodiments, the machine-learning training module 230 may retrain the machine-learning model based on the actual performance of the model after the online system 140 has deployed the model to provide service to users. For example, if the machine-learning model is used to predict a likelihood of an outcome of an event, the online system 140 may log the prediction and an observation of the actual outcome of the event. Alternatively, if the machine-learning model is used to classify an object, the online system 140 may log the classification as well as a label indicating a correct classification of the object (e.g., following a human labeler or other inferred indication of the correct classification). After sufficient additional training data has been acquired, the machine-learning training module 230 re-trains the machine-learning model using the additional training data, using any of the methods described above. This deployment and re-training process may be repeated over the lifetime use for the machine-learning model. This way, the machine-learning model continues to improve its output and adapts to changes in the system environment, thereby improving the functionality of the online system 140 as a whole in its performance of the tasks described herein.

The data store 240 stores data used by the online system 140. For example, the data store 240 stores user data, item data, order data, and picker data for use by the online system 140. The data store 240 also stores trained machine-learning models trained by the machine-learning training module 230. For example, the data store 240 may store the set of parameters for a trained machine-learning model on one or more non-transitory, computer-readable media. The data store 240 uses computer-readable media to store data, and may use databases to organize the stored data.

The triggering module 250 may initiate at various stages of an order fulfillment process a process of determining a preferred buffer amount for preauthorization to cover any additional costs that may occur after a user's checkout during fulfillment of an order placed at the online system 140. The triggering module 250 may initiate the process of determining the preferred buffer amount at the user's checkout (e.g., at the website or an application of the online system 140 running on the user client device 100). Additionally, the triggering module 250 may trigger the process of determining whether to reauthorize an additional buffer amount (or different buffer amount) throughout the fulfillment cycle. An event occurring during the fulfillment cycle that may cause the triggering module 250 to initiate the process of determining whether to reauthorize the additional buffer amount can be: additions of items to a cart by the user (e.g., via a user interface of the user client device 100), additions of items from a picker during picking in a source location (e.g., event signal received from the picker client device 110), replacement of one or more items by a picker during picking in a source location (e.g., event signal received from the picker client device 110), weight fluctuations of weighted items that affect cost of items (e.g., weight of salmon, weight of produce, etc.), tip adjustments by the user (e.g., event signal received from the user client device 100), some other event, or some combination thereof. Based on the event signal, the triggering module 250 may initiate an inference of a trained machine-learning model. At every trigger event, the machine-learning model may infer whether the online system 140 places an additional preauthorization (for initial preauthorization, this is always a positive response); and if so, for how much should the online system 140 authorize.

At each triggering event that initiates the process of determining a preferred authorization buffer, the metric prediction module 260 may access a metric prediction model (e.g., machine-learning model) that is trained to predict an incremental profit (i.e., a change in net income) from a fulfilled order when a given authorization buffer is applied. The metric prediction module 260 may deploy the metric prediction model to run a machine-learning algorithm to input signals to generate a metric value that is indicative of the incremental profit. A set of parameters for the metric prediction model may be stored at one or more non-transitory computer-readable media of the metric prediction module 260. Alternatively, the set of parameters for the metric prediction model may be stored at one or more non-transitory computer-readable media of the data store 240.

The metric value generated by the metric prediction model may be a percentage value that indicates a percentagewise change in profit from a baseline expected value when a given authorization buffer is applied. Alternatively, the metric value generated by the metric prediction model may be a percentage value that indicates a percentagewise change of an absolute profit (i.e., final income from the order) when a given authorization buffer is applied. The authorization buffer may represent an amount relative to a control buffer amount (e.g., 5% increase of the control buffer amount). The metric prediction model may predict a set of metric values for a range of authorization buffers. The metric prediction module 260 may then select a preferred authorization buffer based on the predicted set of metric values, i.e., an authorization buffer among the range of authorization buffers that results, when applied, in a largest metric value among the predicted set of metric values, e.g., the largest incremental profit or the largest increase of net income from the order.

In one or more other embodiments, the metric value generated by the metric prediction model is a value indicative of a predicted total cost from unpaid amounts, such as from items that were delivered but not paid for. In one or more other embodiments, the metric value generated by the metric prediction model is a value indicative of a predicted total cost from payment fees for authorization holds and charges. In one or more other embodiments, the metric value generated by the metric prediction model is a value indicative of a predicted variable contribution profit for the order.

In providing the input signals to the metric prediction model, in addition to authorization buffer amounts taken from a range of authorization buffer amounts, the metric prediction module 260 may provide user data, order data, source data, treatment data, some other data, or some combination thereof. In providing the user data to the metric prediction model, the metric prediction module 260 may provide: an average starting cart size for user's prior orders, an average final cart size for user's prior orders, an average change between a starting cart size and a final cart size for user's prior orders, information about items the user added after the checkouts, prior unpaid amounts for the user, prior user-side modifications on orders, prior picker-side modifications on orders approved by the user, recovery rates for the user on any prior unpaid amounts, a churn probability for the user, a level of user's elasticity, an average tip amount for the user; information about a variability in user's historical tipping behavior, some other user related features, or some combination thereof. The metric prediction module 260 may directly retrieve some of the user data from a user catalog database (e.g., stored at the data store 240), and the metric prediction module 260 may derive some of the user data from the retrieved user catalog data.

In providing the order data to the metric prediction model, the metric prediction module 260 may provide a real-time cart size for a user's current order, information about one or more payment methods used for the current order, information about a delivery type for the current order (e.g., pickup vs. delivery), some other order related data, or some combination thereof. The metric prediction module 260 may receive the order data in real time from the user client device 100 via the network 130.

In providing the source data to the metric prediction model, the metric prediction module 260 may provide information about a type of a source that is servicing the current order (e.g., grocery store, club store, convenience store, liquor store, etc.), an average item size for a given source that is servicing the current order, some other source related data, or some combination thereof. The metric prediction module 260 may receive the source data from the source computing system 120, the user client device 100 and/or the picker client device 110 via the network 130.

In providing the treatment data to the metric prediction model, the metric prediction module 260 may provide experimental assignment data from a set of conducted experiments when users of the online system 140 were randomly assigned to different authorization rulesets (i.e., different authorization buffers). The metric prediction module 260 may retrieve the treatment data from the data store 240.

Based on predicted metric values (e.g., predicted incremental profits) for a range of authorization buffers generated by the metric prediction model, the metric prediction module 260 may select a preferred authorization buffer, i.e., an authorization buffer resulting in a largest metric value. By selecting the preferred authorization buffer, the metric prediction module 260 may effectively select a specific ruleset from a set of rulesets, which defines how to proceed with initial authorization as well as additional authorizations. One example ruleset can be the following: the initial authorization is 110% of the cart total with a $5 minimum and a $25 maximum, rounded to the nearest $1; and the additional authorization is an additional $25 authorization whenever the prior authorization is exceeded. Another example ruleset can be the following: the initial authorization is a cart total plus $5 flat authorization amount; and the additional authorization is 200% of the amount that exceeds a prior authorization.

In one or more embodiments, the metric prediction model is a heterogeneous treatment effects machine-learning model that is trained to predict the treatment effect of applying different authorization rulesets when charging a user of the online system 140. The metric prediction model may estimate the treatment effects of the benefit (e.g., increased order flow and/or gross transaction value (GTV)) and the different costs (e.g., unpaid amounts plus credit card processing fees). A contextual bandit model may be then used to assign propensities for each ruleset based on the predicted incremental profit (or net reward).

In one or more other embodiments, the metric prediction model is an X-learner model that utilizes XGBoost or neural nets as the base-learner. In one or more other embodiments, the metric prediction model is an S-learner model with different model architectures (e.g., XGBoost, neural nets, etc.). In one or more other embodiments, the metric prediction model includes a set of machine-learning models where each machine-learning model may be applied to generate a respective outcome label (e.g., final revenue, unpaid amounts, and payment fees). After that, these different model predictions can be used to construct the incremental profit (i.e., net reward). Alternatively, the metric prediction model is a single machine-learning model trained directly on the incremental profits (i.e., net rewards).

At inference, the metric prediction model may generate one or more of the aforementioned predicted outcome labels. In one or more embodiments, the metric prediction model is a batch inference machine-learning model. In one or more other embodiments, the metric prediction model is a real-time inference machine-learning model that takes as inputs real-time features, such as a current order total, number of items, time of day, etc. Then, the metric prediction module 260 may use the incremental profit prediction (i.e., net reward prediction) to generate a distribution of assignment propensities across the available authorization rulesets. For example, the generated propensities may specify that a user will have a 73% probability of assignment to Ruleset 1, a 10% probability of assignment to Ruleset 2, and a 17% probability of assignment to Ruleset 3. In one or more embodiments, the SoftMax function is used to generate the propensities from the incremental profit predictions (i.e., net reward predictions).

Based on the generated propensities, the user may be randomly assigned (e.g., via the order management module 220) to one of the rulesets, which can impact how initial and subsequent authorizations are sequenced. In one or more embodiments, the assignment to a specific ruleset persists for a defined amount of time (e.g., several days), and the order management module 220 may apply the assigned ruleset to subsequent orders. The assignments to specific rulesets for different users may be cached (e.g., in DynamoDB table as part of the data store 240) for subsequent lookup by the online system 140 (e.g., by the order management module 220).

In one or more other embodiments, the order management module 220 applies the assignment to a specific ruleset for a given user only for a single order, and the order management module 220 may generate a new assignment for every subsequent order. The metric prediction module 260 may store inputs to the metric prediction model, propensities, assigned action, subsequent outcomes, etc. as logged entries into the data store 240. The machine-learning training module 230 may retrieve the logged entries from the data store 240 and utilize them for retraining of the metric prediction model in a causally valid manner using, e.g., inverse propensity score and off-policy evaluation.

The machine-learning training module 230 may perform initial training of the metric prediction model using training data. The machine-learning training module 230 may generate the training data by performing experimentation using different authorization buffers (e.g., 5% increase of a control buffer amount, 10% increase of the control buffer amount, 15% increase of the control buffer amount, etc.) and computing an incremental profit from each authorization buffer (or, alternatively, payment costs, failed post-delivery charges, etc.). It should be noted that an incremental profit can be negative, i.e., can represent a loss due to additional charges that were not preauthorized. The machine-learning training module 230 may generate labels for the training data, where each label indicates an incremental profit for a specific authorization buffer. The machine-learning training module 230 may then use information about each pair of an authorization buffer and an incremental profit to generate a corresponding label that is included in the training data. The machine-learning training module 230 may train the metric prediction model using the training data to generate initial values for the set of parameters of the metric prediction model.

The machine-learning training module 230 may collect feedback data with information about a result of each order fulfillment from a set of order fulfillments when a preferred authorization buffer and a corresponding ruleset are applied for that order fulfillment. The result may be information about an incremental profit (e.g., positive, or negative) for each order fulfillment. This information may be recorded at the user client device 100, the picker client device 110 and/or the source computing system 120 and communicated, via the network 130, to the online system 140 and the machine-learning training module 230 as the feedback data. The machine-learning training module 230 may then re-train the metric prediction model by updating the set of parameters of the metric prediction model using the feedback data. If the resulting incremental profit is negative, this information would be used as a negative reinforcement for re-training of the metric prediction model. In contrast, if the resulting incremental profit is positive, this information would be used as a positive reinforcement for re-training of the metric prediction model.

Figure 3:
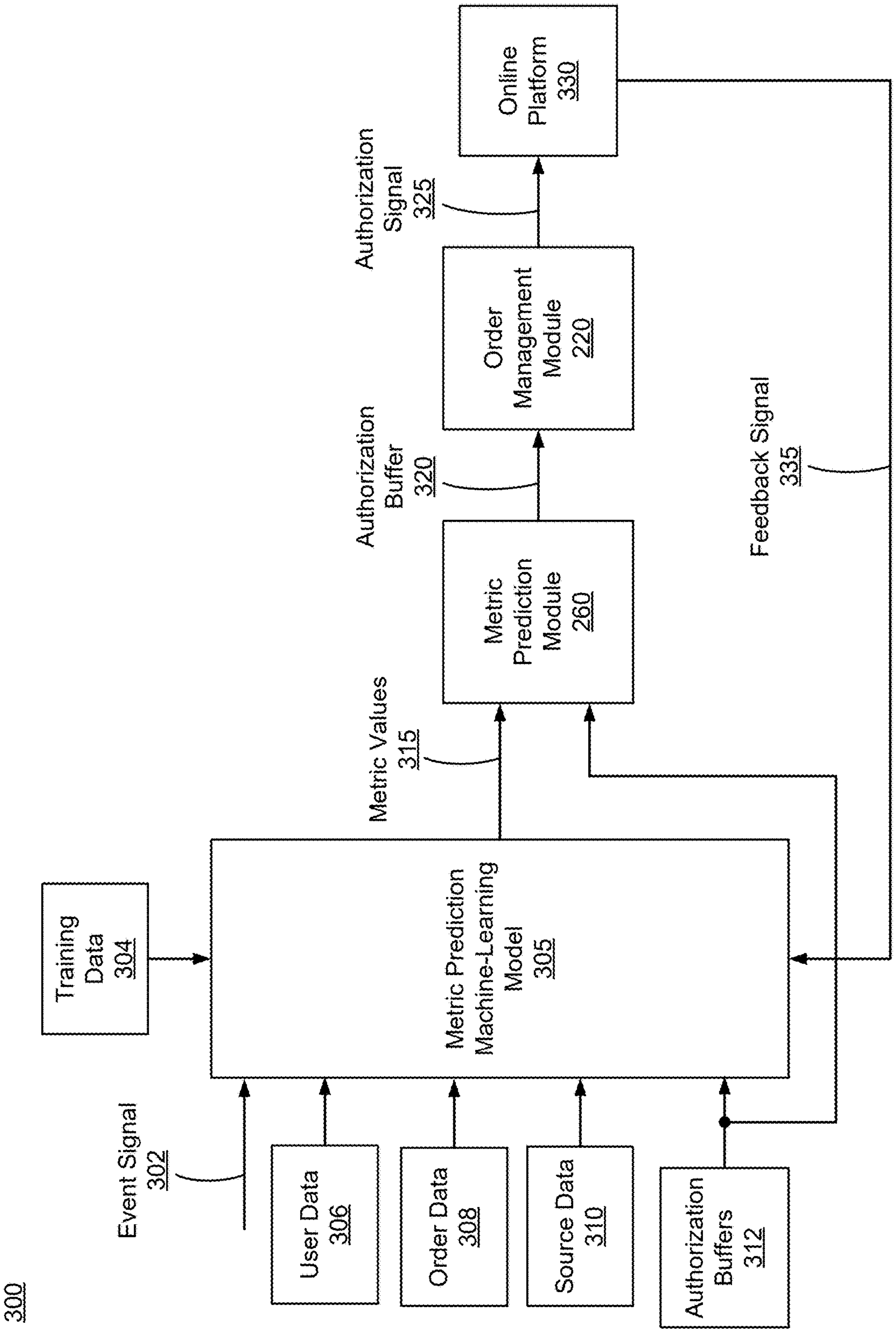
FIG. 3 illustrates an example architectural flow diagram of using a trained machine-learning model of an online system for dynamic modification of an order authorization buffer, in accordance with one or more embodiments.

FIG. 3 illustrates an example architectural flow diagram 300 of using a metric prediction machine-learning model 305 of the online system 140 for dynamic modification of an authorization buffer, in accordance with one or more embodiments. The process flow may be initiated upon receiving an event signal 302 indicating that a user of the online system 140 enters a conversion stage of an order when the user converts on items included in the order. The conversion stage may be an online checkout stage when the user places the order at the online system 140, e.g., via a user interface of the user client device 100. The conversion stage may occur before a picker who fulfills the order (or the user) is checking out at a source location. The event signal 302 may be generated by the triggering module 250 and passed to the metric prediction machine-learning model 305. Additionally, the event signal 302 may be also generated during later stages of the order, i.e., after the user's checkout. Every time a new event signal 302 is generated (e.g., via the triggering module 250), the process flow of identifying a preferred authorization buffer amount may start again. The new event signal 302 may be generated when the user adds one or more items to the order after the checkout stage of the order. Alternatively, the new event signal 302 may be generated when a picker who is servicing the order adds one or more items to the order in a source location upon a request received from the user client device 100. Alternatively, the new event signal 302 may be generated when the picker replaces in the source location at least one item in the order with at least one replacement item (e.g., after receiving an approval signal from the user client device 100). Alternatively, the new event signal 302 may be generated when one or more weights of one or more items (e.g., weighted items) in the order are greater than one or more initially estimated weights of the one or more items that are used for estimating an expected value of the order.

Prior to running the machine-learning algorithm of the metric prediction machine-learning model 305, the online system 140 may perform (e.g., via the machine-learning training module 230) initial training of the metric prediction machine-learning model 305 using training data 304 to generate initial values for a set of parameters of the metric prediction machine-learning model 305. The training data 304 may be generated (e.g., via the machine-learning training module 230) by performing experimentation using different authorization buffers (e.g., 5% increase of a control buffer amount, 10% increase of the control buffer amount, 15% increase of the control buffer amount, etc.) and computing an incremental profit (e.g., positive, or negative) resulted from applying each authorization buffer. The machine-learning training module 230 may generate labels for the training data, where each label indicates an incremental profit for a specific authorization buffer. After the training process is completed, the online system 140 may provide a set of inputs to the metric prediction machine-learning model 305 (e.g., via the metric prediction module 260), such as user data 306, order data 308, source data 310, and a set of authorization buffers 312. Some additional inputs not shown in FIG. 3 may be further provided to the metric prediction machine-learning model 305.

In providing the user data 306 to the metric prediction machine-learning model 305, the metric prediction module 260 may provide: an average starting cart size for user's prior orders, an average final cart size for user's prior orders, an average change between a starting cart size and a final cart size for user's prior orders, information about items the user added after the checkouts, prior unpaid amounts for the user, prior user-side modifications on orders, prior picker-side modifications on orders approved by the user, recovery rates for the user on any prior unpaid amounts, a churn probability for the user, a level of user's elasticity, an average tip amount for the user; information about a variability in user's historical tipping behavior, some other user related data, or some combination thereof. The metric prediction module 260 may directly retrieve some of the user data 306 from a user catalog database (e.g., stored at the data store 240), and may derive some of the user data 306 from raw data retrieved from the user catalog database.

In providing the order data 308 to the metric prediction machine-learning model 305, the metric prediction module 260 may provide real-time cart size for a user's current order, information about one or more payment methods used for the current order, information about a delivery type for the current order (e.g., pickup vs. delivery), some other order related data, or some combination thereof. The metric prediction module 260 may receive the order data 308 in real time from the user client device 100 via the network 130.

In providing the source data 310 to the metric prediction machine-learning model 305, the metric prediction module 260 may provide information about a type of a source that is servicing the current order (e.g., grocery store, club store, convenience store, liquor store, etc.), an average item size for a given source that is servicing the current order, some other source related data, or some combination thereof. The metric prediction module 260 may receive the source data 310 from the source computing system 120, the user client device 100 and/or the picker client device 110 via the network 130.

In addition to the user data 306, the order data 308, and/or the source data 310, the metric prediction module 260 may provide the set of authorization buffers 312 (e.g., set of authorization buffer amounts) to the metric prediction machine-learning model 305 for which a set of metric values 315 may be computed. The set of authorization buffers 312 may be a relative increase (e.g., percentagewise) of the authorization buffer relative to a control buffer, such as 5% increase of the control buffer, 10% increase of the control buffer, 15% increase of the control buffer, etc. The metric prediction module 260 may retrieve the set of authorization buffers 312 from an authorization buffer catalog database (e.g., stored at the data store 240).

Upon receiving the event signal 302, the metric prediction machine-learning model 305 may apply, for each authorization buffer in the set of authorization buffers 312, the machine-learning algorithm to the user data 306, the order data 308, and/or the source data to generate a set of metric values 315, each metric value in the set of metric values 315 resulting from applying a respective authorization buffer from the set of authorization buffers 312 that authorizes charging the user the respective authorization buffer amount over the expected cost of the order if a cost of the order when the order is delivered to the user is greater than the expected cost of the order. Each metric value in the set of metric values 315 may represent a set of changes (e.g., percentagewise) in a net income (e.g., incremental profit) upon the fulfillment of the order, where each change in the net income results from charging the user the respective authorization buffer amount from the set of authorization buffers 312 over the expected cost of the order. The metric prediction machine-learning model 305 may pass the set of metric values 315 to the metric prediction module 260.

The metric prediction module 260 may select, from the set of authorization buffers 312, an authorization buffer 320 that results in a largest metric value among the set of metric values 315, e.g., the largest net income or the largest incremental profit. Each time the new event signal 302 initiates the process flow and the metric prediction machine-learning model 305 generates an updated set of metric values 315 for a modified order, the metric prediction module 260 may compare the authorization buffer 320 (e.g., identified when the user entered the checkout stage) to a second authorization buffer selected from the set of authorization buffers 312 resulting in a largest updated metric value among the updated set of metric values 315. If the authorization buffer 320 is the same as the second authorization buffer, the authorization buffer 320 is still a preferred authorization buffer and does not need to be updated. However, if the authorization buffer 320 is different from the second authorization buffer, the second authorization buffer represents a new preferred authorization buffer and an amount of the authorization buffer 320 is updated to an amount of the second authorization buffer. The metric prediction module 260 may pass the authorization buffer 320 to the order management module 220.

The order management module 220 may use the authorization buffer 320 to generate an authorization signal 325. The authorization signal 325 may authorize applying a ruleset for charging the user for the fulfillment of the order when the order is modified after the checkout and an actual cost of the order is greater than an initially estimated expected cost of the order. The ruleset that is being applied involves applying an amount of the authorization buffer 320 over the initially estimated expected cost of the order when charging the user for the fulfillment of the order. The order management module 220 may send the authorization signal 325 to an online platform 330 (e.g., credit card company) over the network 130.

The authorization signal 325 may authorize the online system 140 charging the user the authorization buffer 320 over the expected cost of the order upon the fulfillment of the order when the final cost of the order is greater than the expected cost of the order. Once the user has been charged the authorization buffer 320 over the expected cost of the order, the online system 140 may receive (e.g., from the online platform 330, the user client device 100, or the source computing system 120) a feedback signal 335 that may be used by the online system 140 (e.g., by the machine-learning training module 230) to derive information about an actual metric value (e.g., actual change in net income or incremental profit) resulting from charging the user the authorization buffer 320 over the expected cost of the order for the fulfillment of the order (i.e., modified order). The machine-learning training module 230 may utilize the feedback signal 335 with information about the actual metric value resulting from applying the authorization buffer 320 to re-train the metric prediction machine-learning model 305. By utilizing feedback signals 335 associated with orders placed at the online system 140 over time, the machine-learning training module 230 may continuously update the set of parameters of the metric prediction machine-learning model 305 and continuously improve the machine-learning algorithm of the metric prediction machine-learning model 305.

Figure 4:
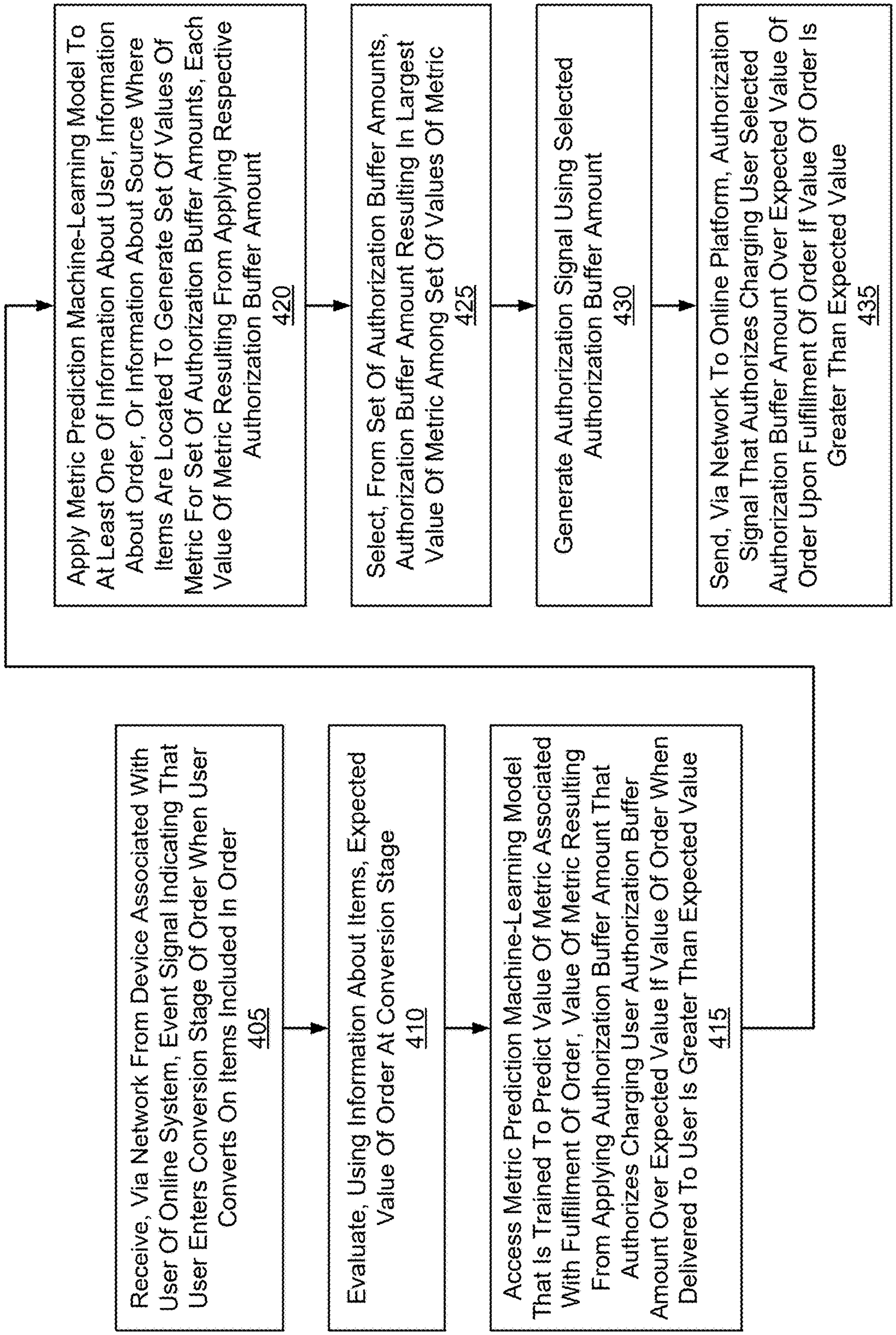
FIG. 4 is a flowchart for a method of using a trained machine-learning model of an online system for dynamic modification of an order authorization buffer, in accordance with one or more embodiments.

FIG. 4 is a flowchart for a method of using a trained machine-learning model of an online system for dynamic modification of an order authorization buffer, in accordance with one or more embodiments. Alternative embodiments may include more, fewer, or different steps from those illustrated in FIG. 4, and the steps may be performed in a different order from that illustrated in FIG. 4. These steps may be performed by an online system (e.g., the online system 140). Additionally, each of these steps may be performed automatically by the online system without human intervention.

The online system 140 receives 405 (e.g., at the triggering module 250), via a network (e.g., the network 130) from a device associated with a user of the online system 140 (e.g., the user client device 100), an event signal indicating that the user enters a conversion stage (e.g., checkout stage) of an order when the user converts on items included in the order. The online system 140 evaluates 410 (e.g., via the metric prediction module 260), using information about the items, an expected value (e.g., expected cost) of the order at the conversion stage. The conversion stage may be an online checkout stage when the user places the order at the online system 140, e.g., via a user interface of the user client device 100. The conversion stage may occur before a picker who fulfills the order (or the user) is checking out at a source location.

Responsive to the received event signal, the online system 140 accesses 415 a metric prediction machine-learning model of the online system 140 (e.g., via the metric prediction module 260), wherein the metric prediction machine-learning model is trained to predict a value of a metric associated with a fulfillment of the order, the value of the metric resulting from applying an authorization buffer amount that authorizes charging the user the authorization buffer amount over the expected value of the order if a value of the order (e.g., cost of the order) when the order is delivered to the user is greater than the expected value of the order. The online system 140 applies 420 the metric prediction machine-learning model (e.g., via the metric prediction module 260) to at least one of information about the user, information about the order, or information about a source where the items are located to generate a set of values of the metric for a set of authorization buffer amounts, each value of the metric from the set of values of the metric resulting from the applying a respective authorization buffer amount from the set of authorization buffer amounts.

The online system 140 may retrieve (e.g., via the metric prediction module 260), from a database of the online system 140 (e.g., the data store 240), information about past orders placed by the user. The online system 140 may derive (e.g., via the metric prediction module 260), using the retrieved information, the information about the user including at least one of: an average starting cart size for the past orders, an average final cart size for the past orders, an average change between a starting cart size and a final cart size for the past orders, information about items the user added after entering conversion stages of the past orders, one or more prior unpaid values for the past orders, modifications of the past orders made by agents who serviced the past orders, a probability for the user of stopping placement of online orders at the online system 140, a level of elasticity for the user, or an average tip amount for the user.

The online system 140 may receive (e.g., at the metric prediction module 260), from the device associated with the user and via the network, the information about the order including at least one of a total value of the items in the order, information about one or more payment methods used by the user for the order, or a type of delivery of the order. Alternatively or additionally, the online system 140 may receive (e.g., at the metric prediction module 260), via the network from at least one of the device associated with the user, the device associated with an agent who is servicing the order, or a device associated with the source, the information about the source including at least one of a type of the source or an average item size for the source.

The online system 140 selects 425 (e.g., via the metric prediction module 260), from the set of authorization buffer amounts, an authorization buffer amount resulting in a largest value of the metric among the set of values of the metric. The online system 140 generates 430 (e.g., via the order management module 220) an authorization signal using the selected authorization buffer amount. The online system 140 sends 435 (e.g., via the order management module 220), via the network to an online platform (e.g., credit card company), the authorization signal that authorizes charging the user the selected authorization buffer amount over the expected value of the order upon the fulfillment of the order if the value of the order is greater than the expected value of the order.

The online system 140 may receive (e.g., at the triggering module 250), from at least one of the device associated with the user or a device associated with an agent who is servicing the order (e.g., the picker client device 110) and via the network, a trigger signal indicating a modification of the order after the conversion stage resulting into a modified order. Responsive to the received trigger signal, the online system 140 may apply the metric prediction machine-learning model (e.g., via the metric prediction module 260) further to information about the modification of the order to generate a set of updated values of the metric for the set of authorization buffer amounts, each updated value of the metric from the set of updated values of the metric associated with a fulfillment of the modified order resulting from the applying the respective authorization buffer amount from the set of authorization buffer amounts. The online system 140 may select (e.g., via the metric prediction module 260), from the set of authorization buffer amounts, a second authorization buffer amount resulting in a largest value of the metric among the set of updated values of the metric. The online system 140 may compare (e.g., via the metric prediction module 260) the selected second authorization buffer amount to the selected authorization buffer. Responsive to the selected second authorization buffer amount being different from the selected authorization buffer, the online system 140 may generate (e.g., via the order management module 220) a second authorization signal using the selected second authorization buffer amount. The online system 140 may send (e.g., via the order management module 220), via the network to the online platform, the second authorization signal that authorizes charging the user the selected second authorization buffer amount over the expected value upon the fulfillment of the modified order if a value of the modified order when delivered to the user is greater than the expected value.

The online system 140 may receive (e.g., at the triggering module 250), from the device associated with the user and via the network, the trigger signal indicating the user added one or more items to the order after the user entered the conversion stage. Alternatively, the online system 140 may receive (e.g., at the triggering module 250), from the device associated with the agent and via the network, the trigger signal indicating the agent added one or more items to the order in a location of the source upon a request received from the device associated with the user. Alternatively, the online system 140 may receive (e.g., at the triggering module 250), from the device associated with the agent and via the network, the trigger signal indicating the agent replaced in a location of the source one or more items in the order with one or more replacement items. Alternatively, the online system 140 may receive (e.g., at the triggering module 250), from the device associated with the agent and via the network, the trigger signal indicating that one or more weights of one or more items in the order are greater than one or more initially estimated weights of the one or more items that are used for estimating the expected value of the order.

The online system 140 may apply the metric prediction machine-learning model (e.g., via the metric prediction module 260) to generate the set of values of the metric representing a set of changes in a net income upon the fulfillment of the order, each change in the net income from the set of changes resulting from charging the user the respective authorization buffer amount from the set of authorization buffer amounts over the expected value of the order. Each authorization buffer amount from the set of authorization buffer amounts may represent a respective amount relative to a control buffer amount.

The online system 140 may apply (e.g., via the machine-learning training module 230) a training set of authorization buffer amounts over expected values of a set of orders placed at the online system 140. The online system 140 may compute (e.g., via the machine-learning training module 230) a training set of values of the metric, each training value of the metric from the training set of values of the metric associated with a fulfillment of a respective order from the set of orders that resulted from the applying a respective authorization buffer amount from the training set of authorization buffer amounts. The online system 140 may generate (e.g., via the machine-learning training module 230) a set of labels, each label from the set of labels indicating a respective value of the metric from the training set of values of the metric that resulted from the applying the respective authorization buffer amount from the training set of authorization buffer amounts. The online system 140 may generate (e.g., via the machine-learning training module 230) training data including the set of labels. The online system 140 may train (e.g., via the machine-learning training module 230), using the training data, the metric prediction machine-learning model to generate a set of initial values for a set of parameters of the metric prediction machine-learning model.

The online system 140 may receive (e.g., at the machine-learning training module 230), via the network from at least one of the device associated with the user, the device associated with an agent who is servicing the order, or a device associated with the source (e.g., the source computing system 120), feedback data with information about a value of the metric resulted from charging the user for the fulfillment of the order. The online system 140 may re-train the metric prediction machine-learning model by updating (e.g., via the machine-learning training module 230), using the feedback data, the set of parameters of the metric prediction machine-learning model.

Embodiments of the present disclosure are directed to the online system 140 that utilizes a trained machine-learning model for dynamic modification of an order authorization buffer. The online system 140 runs the trained machine-learning model to predict incremental profits from different authorization buffer amounts, and then identifies a preferred authorization buffer amount that provides the largest predicted incremental profit. The online system 140 may rerun prediction of the preferred authorization buffer amount at various trigger events that may occur throughout the order fulfillment process.

ADDITIONAL CONSIDERATIONS

The foregoing description of the embodiments has been presented for the purpose of illustration; many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include a computer program product or other data combination described herein.

The description herein may describe processes and systems that use machine-learning models in the performance of their described functionalities. A "machine-learning model," as used herein, comprises one or more machine-learning models that perform the described functionality. Machine-learning models may be stored on one or more computer-readable media with a set of weights. These weights are parameters used by the machine-learning model to transform input data received by the model into output data. The weights may be generated through a training process, whereby the machine-learning model is trained based on a set of training examples and labels associated with the training examples. The training process may include: applying the machine-learning model to a training example, comparing an output of the machine-learning model to the label associated with the training example, and updating weights associated with the machine-learning model through a back-propagation process. The weights may be stored on one or more computer-readable media, and are used by a system when applying the machine-learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or." For example, a condition "A or B" is satisfied by any one of the following: A is true (or present) and B is false (or not present); A is false (or not present) and B is true (or present); and both A and B are true (or present). Similarly, a condition "A, B, or C" is satisfied by any combination of A, B, and C being true (or present). As a non-limiting example, the condition "A, B, or C" is satisfied when A and B are true (or present) and C is false (or not present). Similarly, as another non-limiting example, the condition "A, B, or C" is satisfied when A is true (or present) and B and C are false (or not present).

What is claimed is:

1. A method, performed at a computer system comprising a processor and a computer-readable medium, comprising:

receiving, via a network from a device associated with a user of an online system, an event signal indicating that the user enters a conversion stage of an order when the user converts on items included in the order;

evaluating, using information about the items, an expected value of the order at the conversion stage;

responsive to the received event signal, accessing a metric prediction machine-learning model of the online system, wherein the metric prediction machine-learning model is trained to predict a value of a metric associated with a fulfillment of the order, the value of the metric resulting from applying an authorization buffer amount that authorizes charging the user the authorization buffer amount over the expected value of the order if a value of the order when the order is delivered to the user is greater than the expected value of the order;

applying the metric prediction machine-learning model to at least one of information about the user, information about the order, or information about a source where the items are located to generate a set of values of the metric for a set of authorization buffer amounts, each value of the metric from the set of values of the metric resulting from the applying a respective authorization buffer amount from the set of authorization buffer amounts;

selecting, from the set of authorization buffer amounts, an authorization buffer amount resulting in a largest value of the metric among the set of values of the metric;

generating an authorization signal using the selected authorization buffer amount; and sending, via the network to an online platform, the authorization signal that authorizes charging the user the selected authorization buffer amount over the expected value of the order upon the fulfillment of the order if the value of the order is greater than the expected value of the order.

2. The method of claim 1, further comprising:

receiving, from at least one of the device associated with the user or a device associated with an agent who is servicing the order and via the network, a trigger signal indicating a modification of the order after the conversion stage resulting into a modified order;

responsive to the received trigger signal, applying the metric prediction machine-learning model further to information about the modification of the order to generate a set of updated values of the metric for the set of authorization buffer amounts, each updated value of the metric from the set of updated values of the metric associated with a fulfillment of the modified order resulting from the applying the respective authorization buffer amount from the set of authorization buffer amounts;

selecting, from the set of authorization buffer amounts, a second authorization buffer amount resulting in a largest value of the metric among the set of updated values of the metric;

comparing the selected second authorization buffer amount to the selected authorization buffer;

responsive to the selected second authorization buffer amount being different from the selected authorization buffer, generating a second authorization signal using the selected second authorization buffer amount; and sending, via the network to the online platform, the second authorization signal that authorizes charging the user the selected second authorization buffer amount over the expected value upon the fulfillment of the modified order if a value of the modified order when delivered to the user is greater than the expected value.

3. The method of claim 2, wherein receiving the trigger signal comprises:

receiving, from the device associated with the user and via the network, the trigger signal indicating the user added one or more items to the order after the user entered the conversion stage.

4. The method of claim 2, wherein receiving the trigger signal comprises:

receiving, from the device associated with the agent and via the network, the trigger signal indicating the agent added one or more items to the order in a location of the source upon a request received from the device associated with the user.

5. The method of claim 2, wherein receiving the trigger signal comprises:

receiving, from the device associated with the agent and via the network, the trigger signal indicating the agent replaced in a location of the source one or more items in the order with one or more replacement items.

6. The method of claim 2, wherein receiving the trigger signal comprises:

receiving, from the device associated with the agent and via the network, the trigger signal indicating that one or more weights of one or more items in the order are greater than one or more initially estimated weights of the one or more items that are used for estimating the expected value of the order.

7. The method of claim 1, wherein applying the metric prediction machine-learning model comprises:

applying the metric prediction machine-learning model to generate the set of values of the metric representing a set of changes in a net income upon the fulfillment of the order, each change in the net income from the set of changes resulting from charging the user the respective authorization buffer amount from the set of authorization buffer amounts over the expected value of the order.

8. The method of claim 7, wherein each authorization buffer amount from the set of authorization buffer amounts represents a respective amount relative to a control buffer amount.

9. The method of claim 1, further comprising:

retrieving, from a database of the online system, information about past orders placed by the user; and deriving, using the retrieved information, the information about the user including at least one of: an average starting cart size for the past orders, an average final cart size for the past orders, an average change between a starting cart size and a final cart size for the past orders, information about items the user added after entering conversion stages of the past orders, one or more prior unpaid values for the past orders, modifications of the past orders made by agents who serviced the past orders, a probability for the user of stopping placement of online orders at the online system, a level of elasticity for the user, or an average tip amount for the user.

10. The method of claim 1, further comprising:

receiving, from the device associated with the user and via the network, the information about the order including at least one of a total value of the items in the order, information about one or more payment methods used by the user for the order, or a type of delivery of the order.

11. The method of claim 1, further comprising:

receiving, via the network from at least one of the device associated with the user, the device associated with an agent who is servicing the order, or a device associated with the source, the information about the source including at least one of a type of the source or an average item size for the source.

12. The method of claim 1, further comprising:

applying a training set of authorization buffer amounts over expected values of a set of orders placed at the online system;

computing a training set of values of the metric, each training value of the metric from the training set of values of the metric associated with a fulfillment of a respective order from the set of orders that resulted from the applying a respective authorization buffer amount from the training set of authorization buffer amounts;

generating a set of labels, each label from the set of labels indicating a respective value of the metric from the training set of values of the metric that resulted from the applying the respective authorization buffer amount from the training set of authorization buffer amounts;

generating training data including the set of labels; and training, using the training data, the metric prediction machine-learning model to generate a set of initial values for a set of parameters of the metric prediction machine-learning model.

13. The method of claim 1, further comprising:

receiving, via the network from at least one of the device associated with the user, the device associated with an agent who is servicing the order, or a device associated with the source, feedback data with information about a value of the metric resulted from charging the user for the fulfillment of the order; and re-training the metric prediction machine-learning model by updating, using the feedback data, a set of parameters of the metric prediction machine-learning model.

14. A computer program product comprising a non-transitory computer readable storage medium having instructions encoded thereon that, when executed by a processor, cause the processor to perform steps comprising:

receiving, via a network from a device associated with a user of an online system, an event signal indicating that the user enters a conversion stage of an order when the user converts on items included in the order;

evaluating, using information about the items, an expected value of the order at the conversion stage;

responsive to the received event signal, accessing a metric prediction machine-learning model of the online system, wherein the metric prediction machine-learning model is trained to predict a value of a metric associated with a fulfillment of the order, the value of the metric resulting from applying an authorization buffer amount that authorizes charging the user the authorization buffer amount over the expected value of the order if a value of the order when the order is delivered to the user is greater than the expected value of the order;

applying the metric prediction machine-learning model to at least one of information about the user, information about the order, or information about a source where the items are located to generate a set of values of the metric for a set of authorization buffer amounts, each value of the metric from the set of values of the metric resulting from the applying a respective authorization buffer amount from the set of authorization buffer amounts;

selecting, from the set of authorization buffer amounts, an authorization buffer amount resulting in a largest value of the metric among the set of values of the metric;

generating an authorization signal using the selected authorization buffer amount; and sending, via the network to an online platform, the authorization signal that authorizes charging the user the selected authorization buffer amount over the expected value of the order upon the fulfillment of the order if the value of the order is greater than the expected value of the order.

15. The computer program product of claim 14, wherein the instructions further cause the processor to perform steps comprising:

receiving, from at least one of the device associated with the user or a device associated with an agent who is servicing the order and via the network, a trigger signal indicating a modification of the order after the conversion stage resulting into a modified order;

responsive to the received trigger signal, applying the metric prediction machine-learning model further to information about the modification of the order to generate a set of updated values of the metric for the set of authorization buffer amounts, each updated value of the metric from the set of updated values of the metric associated with a fulfillment of the modified order resulting from the applying the respective authorization buffer amount from the set of authorization buffer amounts;

selecting, from the set of authorization buffer amounts, a second authorization buffer amount resulting in a largest value of the metric among the set of updated values of the metric;

comparing the selected second authorization buffer amount to the selected authorization buffer;

responsive to the selected second authorization buffer amount being different from the selected authorization buffer, generating a second authorization signal using the selected second authorization buffer amount; and sending, via the network to the online platform, the second authorization signal that authorizes charging the user the selected second authorization buffer amount over the expected value upon the fulfillment of the modified order if a value of the modified order when delivered to the user is greater than the expected value.

16. The computer program product of claim 15, wherein the instructions further cause the processor to perform steps comprising:

receiving, from the device associated with the user and via the network, the trigger signal indicating the user added one or more items to the order after the user entered the conversion stage.

17. The computer program product of claim 15, wherein the instructions further cause the processor to perform steps comprising:

receiving, from the device associated with the agent and via the network, the trigger signal indicating at least one of the agent added one or more items to the order in a location of the source upon a request received from the device associated with the user, or the agent replaced in the location of the source at least one item in the order with at least one replacement item.

18. The computer program product of claim 14, wherein the instructions further cause the processor to perform steps comprising:

receiving, from the device associated with the user and via the network, the information about the order including at least one of a total value of the items in the order, information about one or more payment methods used by the user for the order, or a type of delivery of the order.

19. The computer program product of claim 14, wherein the instructions further cause the processor to perform steps comprising:

applying a training set of authorization buffer amounts over expected values of a set of orders placed at the online system;

computing a training set of values of the metric, each training value of the metric from the training set of values of the metric associated with a fulfillment of a respective order from the set of orders that resulted from the applying a respective authorization buffer amount from the training set of authorization buffer amounts;

generating a set of labels, each label from the set of labels indicating a respective value of the metric from the training set of values of the metric that resulted from the applying the respective authorization buffer amount from the training set of authorization buffer amounts;

generating training data including the set of labels;

training, using the training data, the metric prediction machine-learning model to generate a set of initial values for a set of parameters of the metric prediction machine-learning model;

receiving, via the network from at least one of the device associated with the user, the device associated with an agent who is servicing the order, or a device associated with the source, feedback data with information about a value of the metric resulted from charging the user for the fulfillment of the order; and re-training the metric prediction machine-learning model by updating, using the feedback data, the set of parameters of the metric prediction machine-learning model.

20. A computer system comprising:

a processor; and a non-transitory computer-readable storage medium having instructions that, when executed by the processor, cause the computer system to perform steps comprising:

receiving, via a network from a device associated with a user of an online system, an event signal indicating that the user enters a conversion stage of an order when the user converts on items included in the order;

evaluating, using information about the items, an expected value of the order at the conversion stage;

responsive to the received event signal, accessing a metric prediction machine-learning model of the online system, wherein the metric prediction machine-learning model is trained to predict a value of a metric associated with a fulfillment of the order, the value of the metric resulting from applying an authorization buffer amount that authorizes charging the user the authorization buffer amount over the expected value of the order if a value of the order when the order is delivered to the user is greater than the expected value of the order;

applying the metric prediction machine-learning model to at least one of information about the user, information about the order, or information about a source where the items are located to generate a set of values of the metric for a set of authorization buffer amounts, each value of the metric from the set of values of the metric resulting from the applying a respective authorization buffer amount from the set of authorization buffer amounts;

selecting, from the set of authorization buffer amounts, an authorization buffer amount resulting in a largest value of the metric among the set of values of the metric;

generating an authorization signal using the selected authorization buffer amount; and sending, via the network to an online platform, the authorization signal that authorizes charging the user the selected authorization buffer amount over the expected value of the order upon the fulfillment of the order if the value of the order is greater than the expected value of the order.

* * * * *